US008260067B2

(12) United States Patent
Shi et al.

(10) Patent No.: US 8,260,067 B2
(45) Date of Patent: Sep. 4, 2012

(54) DETECTION TECHNIQUE FOR DIGITALLY ALTERED IMAGES

(75) Inventors: Yun-Qing Shi, Millburn, NJ (US); Bin Li, Shenzhen (CN)

(73) Assignee: New Jersey Institute of Technology, Newark, NJ (US)

( * ) Notice: Subject to any disclaimer, the term of this patent is extended or adjusted under 35 U.S.C. 154(b) by 330 days.

(21) Appl. No.: 12/421,949

(22) Filed: Apr. 10, 2009

(65) Prior Publication Data

US 2009/0263011 A1 Oct. 22, 2009

Related U.S. Application Data

(60) Provisional application No. 61/045,753, filed on Apr. 17, 2008.

(51) Int. Cl.
*G06K 9/36* (2006.01)
*G06K 9/38* (2006.01)
*G06K 9/46* (2006.01)
(52) U.S. Cl. .......................... 382/232; 382/250; 382/251
(58) Field of Classification Search .......................... None
See application file for complete search history.

(56) References Cited

U.S. PATENT DOCUMENTS

2008/0031535 A1* 2/2008 Shi et al. ....................... 382/250

OTHER PUBLICATIONS

D Fu, YQ Shi, W Su "A generalized Benford's law for JPEG coefficients and its applications in image forensics", Proc. of SPIE Electronic Imaging, Security and Watermarking of Multimedia Contents IX, vol. 6505, pp. 1L1-1L11, Jan. 2007.*
T Pevný, J Fridrich, "Detection of double-compression in JPEG images for applications in steganography", IEEE Transactions on Information Forensics and Security, vol. 3, Issue: 2: 2008, pp. 247-258.*
Reininger, R.; Gibson, J.; "Distributions of the Two-Dimensional DCT Coefficients for Images", IEEE Transactions on Communications, vol. 31, Issue: 6, 1983, pp. 835-839.*
Perez-Gonzalez, F.; Heileman, G.L.; Abdallah, C.T, "Benford's Law in Image Processing", IEEE International Conference on Image Processing, Sep. 16-Oct. 19, 2007.*
J. Lukas and J. Fridrich, "Estimation of Primary. Quantization Matrix in Double Compressed JPEG. Images", Digital Forensic Research Workshop, 2003.*
Li, Bin et al., "Detecting Doubly Compressed JPEG Images by Using Mode Based First Digit Features," IEEE Workshop on Multimedia Signal Processing, 2008, pp. 730-735.

* cited by examiner

*Primary Examiner* — Li Liu
(74) *Attorney, Agent, or Firm* — Steven S. Rubin, Esq.; Moritt Hock & Hamroff LLP

(57) ABSTRACT

Techniques are generally described to determine whether a JPEG image has undergone two compressions. Probabilities can be computed for the first digits of quantized DCT (discrete cosine transform) coefficients from a set of AC (alternate current) modes to detect or determine whether the JPEG image has undergone two compressions. The set of AC modes may include a predetermined number of distinguishable AC modes where a distinguishable AC mode may be an AC mode in which a second quantization step (QS2) is not an integer multiple of the first quantization step (QS1). Classifiers may be created during a training process, and later may be used to assist in determining whether a suspect JPEG image has undergone two compressions. When the classifiers support a multi-classification system, described detection techniques may also be arranged to determine a primary quality factor for the double compressed JPEG image.

20 Claims, 12 Drawing Sheets

Grid 500

| 2 | 1₁ | 1₅ | 2₆ | 2₁₄ | 4₁₅ | 5 | 6 |
|---|---|---|---|---|---|---|---|
| 1₂ | 1₄ | 1₇ | 2₁₃ | 3₁₆ | 6 | 6 | 6 |
| 1₃ | 1₈ | 2₁₂ | 2₁₇ | 4 | 6 | 7 | 6 |
| 1₉ | 2₁₁ | 2₁₈ | 3 | 5 | 9 | 8 | 6 |
| 2₁₀ | 2₁₉ | 4 | 6 | 7 | 11 | 10 | 8 |
| 2₂₀ | 4 | 6 | 6 | 8 | 10 | 11 | 9 |
| 5 | 6 | 8 | 9 | 10 | 12 | 12 | 10 |
| 7 | 9 | 10 | 10 | 11 | 10 | 10 | 10 |

510 labels the left boundary region.

Grid 502

| 16 | 11 | 10 | 16 | 24 | 40₁₅ | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

*Fig. 5*

1100 A COMPUTER PROGRAM PRODUCT

1102 COMPUTER STORAGE MEDIA HAVING ONE OR MORE COMPUTER-EXECUTABLE INSTRUCTIONS INCLUDING

1110 IDENTIFYING A SET OF QUANTIZED DCT BLOCKS THAT REPRESENT THE SUSPECT IMAGE

1112 FOR EACH QUANTIZED DCT BLOCK REPRESENTING THE SUSPECT IMAGE:

1114 COMPUTING A FIRST DIGIT FOR EACH QUANTIZED DCT COEFFICIENT IN EACH K AC MODE

1116 CREATING A FEATURE VECTOR USING THE FIRST DIGITS

1118 INPUTTING THE FEATURE VECTOR TO A SET OF CLASSIFIERS

1120 DETERMINING A RESULT FOR THE SUSPECT IMAGE BASED ON AN OUTPUT FROM THE SET OF CLASSIFIERS

1104 A RECORDABLE MEDIUM

1106 A COMPUTER-IMPLEMENTED METHOD

*Fig. 11*

1200 A COMPUTER PROGRAM PRODUCT

1202 COMPUTER STORAGE MEDIA HAVING ONE OR MORE COMPUTER-EXECUTABLE INSTRUCTIONS INCLUDING

1210 EXTRACTING A FEATURE VECTOR FROM THE SUSPECT IMAGE, THE FEATURE VECTOR REPRESENTING A FIRST DIGIT DISTRIBUTION OVER K AC MODES

1212 INPUTTING THE FEATURE VECTOR TO A SET OF CLASSIFIERS

1214 DETERMINING A RESULT FOR THE SUSPECT IMAGE, THE RESULT BEING BASED ON OUTPUT FROM THE SET OF CLASSIFIERS AND INDICATING WHETHER THE SUSPECT IMAGE HAS UNDERGONE DOUBLE COMPRESSION

1216 DETERMINING A PRIMARY QUALITY FACTOR FOR THE SUSPECT IMAGE BY ASSIGNING THE FEATURE VECTOR TO EACH CLASS OF A MULTI-CLASS SYSTEM, EACH CLASS REPRESENTING A CANDIDATE PRIMARY QUALITY FACTOR AND USING THE SET OF CLASSIFIERS TO DETERMINE THE MOST LIKELY CLASS

1204 A RECORDABLE MEDIUM

1206 A COMPUTER-IMPLEMENTED METHOD

*Fig. 12*

DETECTION TECHNIQUE FOR DIGITALLY ALTERED IMAGES

REFERENCE TO RELATED APPLICATIONS

This application claims priority to U.S. Provisional Patent Application No. 61/045,753 entitled "Detecting Double JPEG Compressed Images by Using Mode Based First Digit Features", filed on Apr. 17, 2008, which is hereby incorporated by reference for all purposes.

BACKGROUND

The authenticity of images is important in several contexts, such as evidence in a court of law and accuracy in newspaper stories. However, with today's sophisticated software tools, anyone with a computer and some software can easily create fake images that are not easily detected as fake by most casual observers and quite often not even by trained professionals.

The fake image (i.e., digitally altered image) may mislead and or provide inaccurate information to those who view the image. The digitally altered image may also have been edited to contain secret information, which will be decipherable by another user to whom the altered image is sent to facilitate a "secret communication" between or among two or more individuals. Thus, it would be beneficial to be able to identify digitally altered images.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings in which:

FIG. 5 is a diagram of two quantization tables with different quality factors suitable for use during the training process of FIG. 3;

FIG. 11 is a diagram generally illustrating a computer product configured to perform processing that detects an altered digital image in accordance with at least some embodiments of the present disclosure; and FIG. 12 is a diagram generally illustrating another computer product configured to perform processing that detects an altered digital image in accordance with at least some embodiments of the present disclosure.

DETAILED DESCRIPTION

Figure 1:
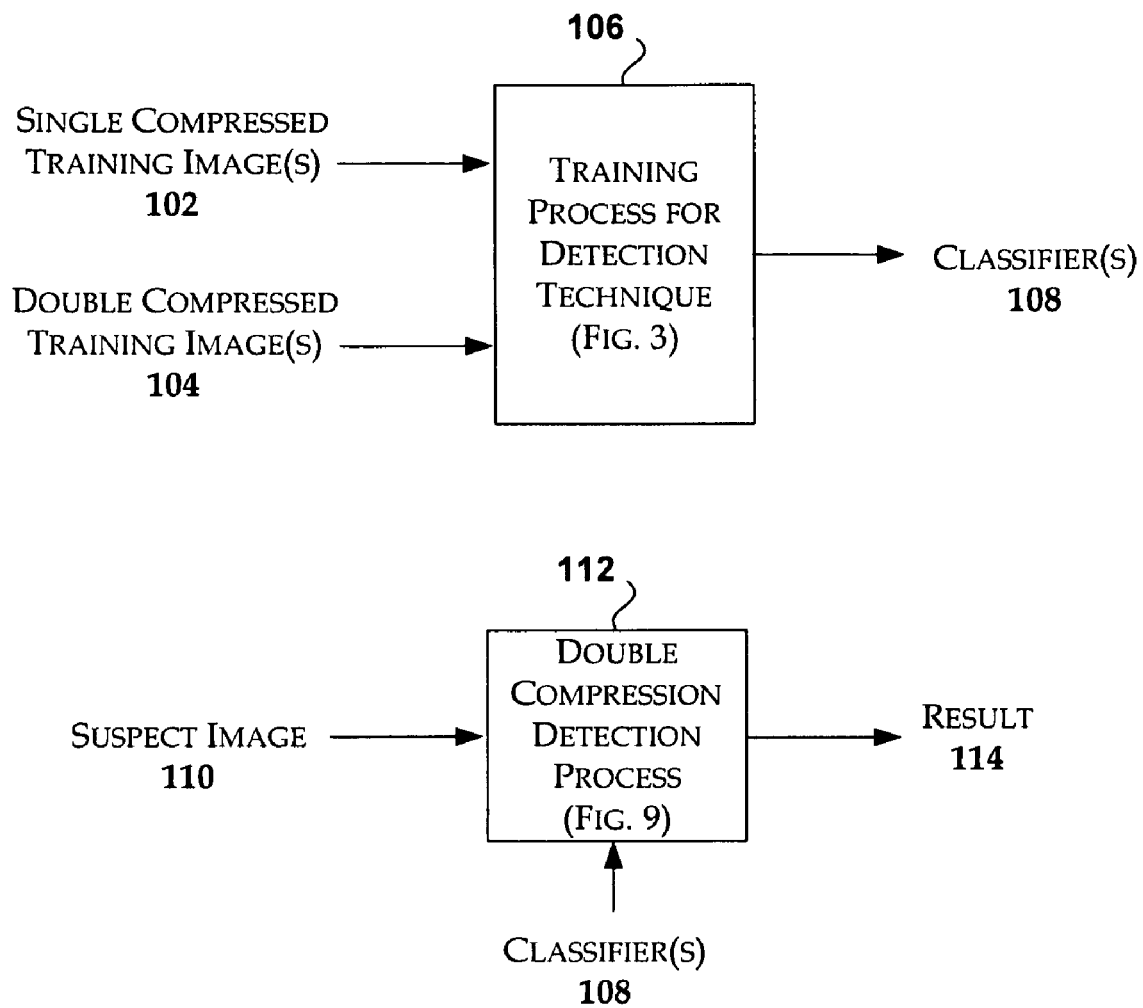
FIG. 1 is a block diagram illustrating an overview of a training process and a double compression detection process of a detection technique in accordance with at least some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, apparatus, computer programs and systems related to detection techniques of digitally altered images. In overview, the detection technique may detect images that have been compressed two or more times, which may indicate that the image may not be an original image. A training process may be employed in which known double compressed images may be evaluated to create a pre-defined number of classifiers for a classification system. Some detection techniques may then utilize the classification system to determine whether a suspect image is double compressed. The described detection technique may further determine a quality factor for the associated original image, thereby revealing the history of the double compressed image.

FIG. 1 is a block diagram illustrating an overview of a training process 106 and a double compression detection process 112 of a detection technique in accordance with some embodiments of the present disclosure. Briefly, the training process 106, which will be described later in conjunction with FIG. 3, inputs one or more single compressed training images 102 and one or more double compressed training images 104. The training process 106 outputs one or more classifiers 108, which may be used during the double compression detection process 112 to determine whether a suspect image 110 has been digitally altered. The outcome of the double compression detection process produces result 114, which may indicate whether the suspect image 110 is an original image or a digitally altered image. The double compression detection process will be described later in conjunction with FIG. 9.

Figure 2:
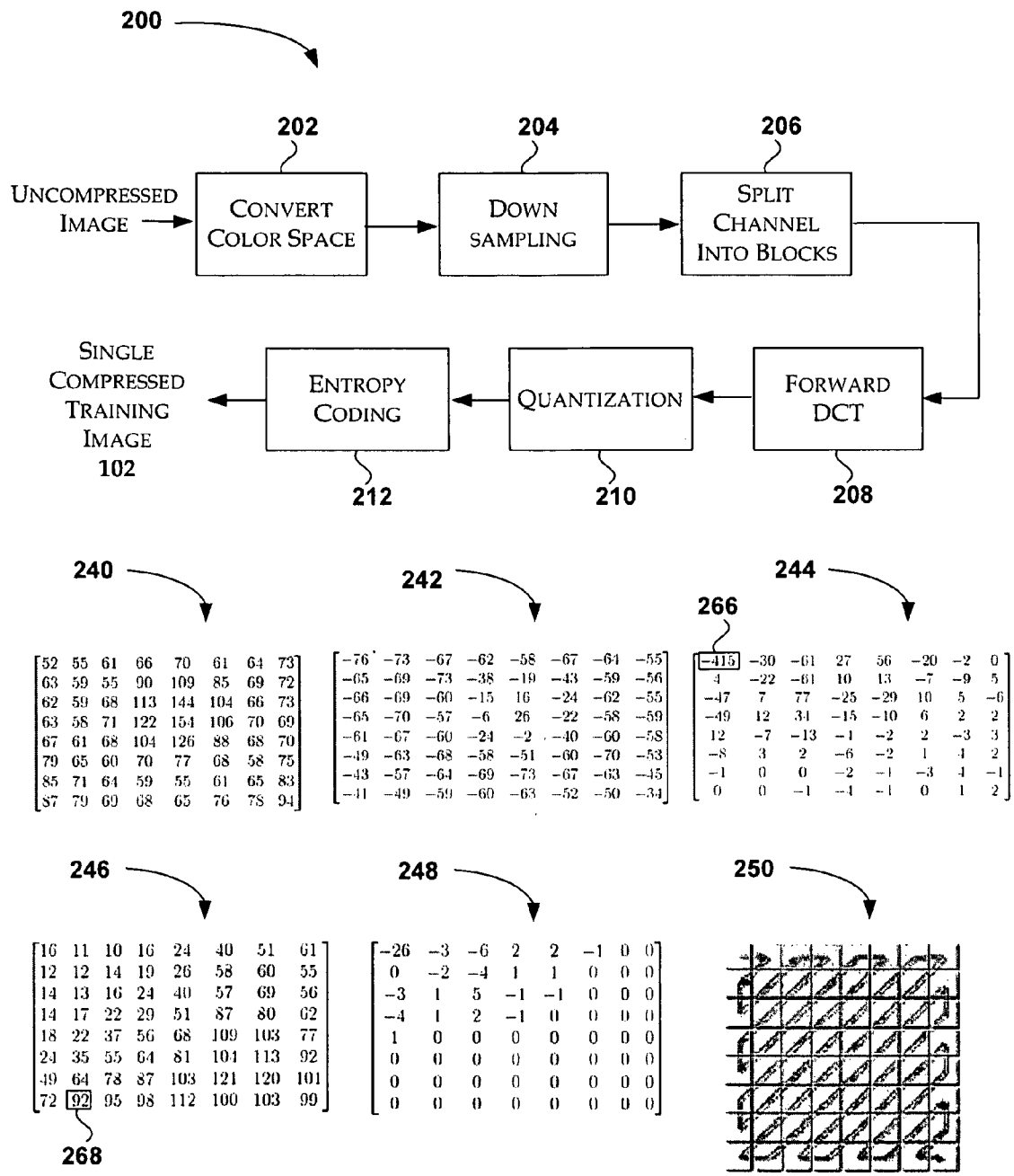
FIG. 2 is a block diagram illustrating an example compression process for creating a single compressed training image that may be used by the training process illustrated in FIG. 1 and also illustrates representations of an image during the compression process in accordance with at least some embodiments of the present disclosure.

FIG. 2 is a block diagram illustrating an example compression process for creating a single compressed training image 102 that may be used by the training process 106 illustrated in FIG. 1 and also illustrates representations of an image during the compression process in accordance with at least some embodiments of the present disclosure. One example compression process 200 employs a JPEG (joint Photographic Experts Group) compression algorithm. JPEG is the name of the committee that created the standard describing a JPEG specification. The JPEG specification defines how an image is compressed into a stream of bytes and defines a file format for storing the stream of bytes. The JPEG specification allows the amount of compression to be adjustable so that a user can decide the trade-off between storage size and image quality.

Image files that employ JPEG compression are referred to as "JPEG files". However, these "JPEG files" may actually be stored in one of several JPEG file formats, such as JFIF JPEG File Interchange Format), Exif (Exchangeable image file format), or other JPEG file formats that are not as common as JFIF and Exif. JPEG is a common image format used by digital cameras and other photographic image capture devices, such as cell phones. The digital camera and/or other photographic image capture device may capture a scene and store the scene as a JPEG image using JPEG compression.

At block 202, an uncompressed image may be optionally converted from RGB (Red-Green-Blue) color space into a YCbCr color space, where Y represents the brightness (i.e., luminance) of the pixel, Cb is the chrominance for the blue component of the pixel, and Cr is the chrominance for the red component of the pixel. By converting to the YCbCr color space, the image may be compressed without a significant effect on perceptual image quality.

At block 204, the spatial resolution of the Cb and Cr components of the uncompressed image may be reduced in a process referred to as "downsampling". Downsampling may be performed at a ration of 4:4:4 (i.e., no downsampling), 4:2:2 (factor of 2 reduction in horizontal direction), or 4:2:0 (factor of 2 reduction in horizontal and vertical directions).

At block 206, each channel (i.e., Y, Cb, and Cr) of the uncompressed image may be split into blocks of non-overlapping and consecutive blocks of pixels, such as an 8×8 block. Each 8×8 block may have 64 pixels each. The component for each pixel may be represented with an integer value [0, 255]. Example sub-image 240 in FIG. 2 illustrates one example set of values for an 8×8 block of pixels.

At block 208, each color component (Cb, and Cr) for each 8×8 block undergoes a forward discrete cosine transform (DCT) to convert the representation into a frequency-domain representation. However, before the block undergoes DCT, the gray values [0,255] may be shifted from a positive range to one centered around zero [−128, 127] by subtracting 128 from each pixel value. Sub-image 242 shown in FIG. 2 is the resultant sub-image after sub-image 240 undergoes this shift. After applying the DCT, the resulting sub-image is a DCT block 244, which also has a set of 64 values referred to as DCT coefficients. Typically, DCT block 244 has a large value in the top-left corner, which is referred to as the DC (direct current) coefficient (i.e., DC coefficient 266). The remaining 63 coefficients are referred to as AC (alternate current) coefficients. While only one DCT block 244 is shown in FIG. 2, it will be appreciated that multiple DCT blocks may be created in order to represent one image. All of the DCT coefficients located in the same position within each of the 8×8 DCT blocks form a mode or sub-band. After performing the forward DCT, most of the signal is aggregated in one corner of the resulting DCT block 244.

At block 210, quantization of DCT block 244 is performed. Because the human eye can not distinguish the exact strength of a high frequency brightness variation, the amount of information in the high frequency components can be reduced. This may be achieved by dividing each component in the frequency domain by a constant for that component and then rounding to the nearest integer. This results in a loss of detail and is why JPEG compression is referred to as a lossy compression scheme. The JPEG standard specifies different quantization tables. Quantization table 246 is one example. Quantization table 246 has 64 integer-valued quantization steps (QSs) (e.g., quantization step 268), which are used to quantize the DCT coefficients in the DCT block 244. DCT coefficients from the same mode share the same quantization step (i.e., value from the quantization table). The quantization table may be arbitrarily defined, however, there is a standard quantization table recommended in the JPEG standard. A trade-off between visual quality and compression rate may be achieved by using a proper quality factor (QF) where QF=100 corresponds to the best quality with the least amount of compression and QF=1 corresponds to the lowest quality with the best compression. A standard quantization table may have a quality factor QF=50.

In overview, the quantization steps form a 8×8 matrix. The quantization step in the position (u,v) of the matrix is denoted by q(u,v), where $1 \leq u \leq 8$, $1 \leq v \leq 8$. Each quantization step q(u,v) is determined based on the quality factor, denoted by QF, as follows:

$$q(u, v) = \begin{cases} \max\left(\left\lfloor \frac{200 - 2 \times QF}{100} q_{50}(u, v) + \frac{1}{2} \right\rfloor\right), & \text{when } 50 \leq QF \leq 100 \\ \left\lfloor \frac{50}{QF} q_{50}(u, v) + \frac{1}{2} \right\rfloor, & \text{when } 0 < QF < 50 \end{cases} \quad (1)$$

$$\text{where } q_{50} = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}.$$

The operation denoted with brackets $\lfloor . \rfloor$ in Eq. (1) is the operation of floor rounding, commonly referred to as truncation. The outcome of quantization provides a quantized DCT block 248.

At block 212, entropy coding may be performed on the quantized DCT block 248. Entropy coding is a special form of lossless data compression that involves arranging the image components in a "zigzag" order (i.e., zigzag order is shown in block 250) and employing run-length encoding (RLE) that groups similar frequencies together, inserts length coding zeros, and may use Huffman coding on the remaining data.

The outcome of compression process 200 yields a single compressed training image 102. Compression process 200 may also yield a double compressed training image 104 (shown in FIG. 1) by starting with a single compressed training image instead of an uncompressed image. The single compressed training image then undergoes compression process 200. The quantization table used for compressing the single compressed training image at block 210 may be different than the quantization table used in originally compressing the single compressed training image.

The feasibility of determining whether a JPEG image has undergone double JPEG compression may be partially based on whether quantization steps (QSs) in the primary compression differ with the quantization steps in the secondary compression. The DCT quantization coefficients after the primary (i.e., first) compression may be close to multiples of the primary quantization step (QS1). However, if the second quantization step (QS2) is not an integer multiple of the primary quantization step, the second compression may introduce differences in the QDCT coefficients with respect to the first compression.

Figure 3:
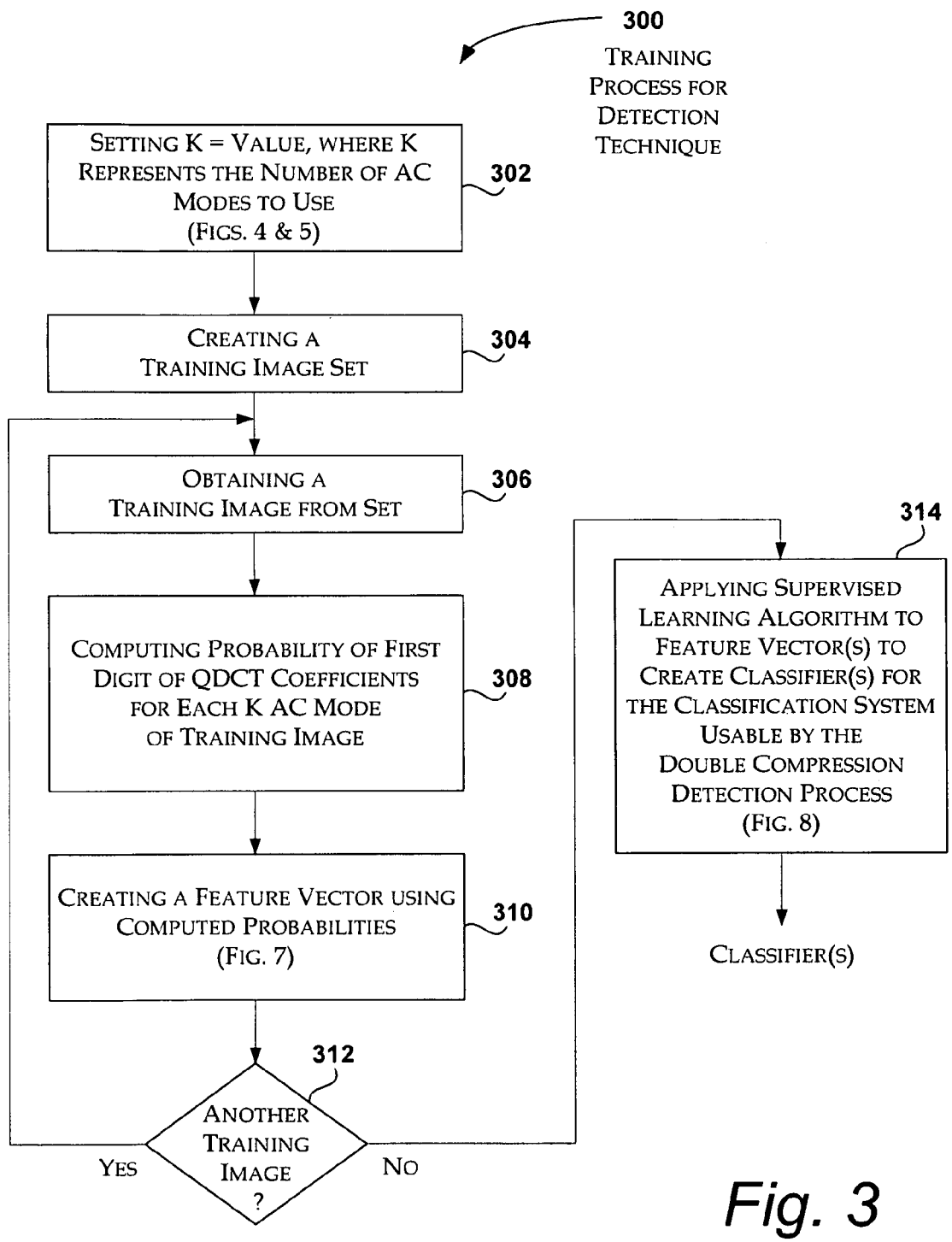
FIG. 3 is a flow diagram illustrating a training process suitable for use in FIG. 1 for creating classifiers that may be used by the double compression detection process shown in FIG. 1 for detecting double compressed images in accordance with at least some embodiments of the present disclosure.

FIG. 3 is a flow diagram illustrating a training process 300 suitable for use in FIG. 1 for creating classifiers that may be used by the double compression detection process shown in FIG. 1 for detecting double compressed images in accordance with at least some embodiments of the present disclosure. The example training process 300 illustrated in FIG. 3 may include one or more processing operations as illustrated by blocks 302, 304, 306, 308, 310, and 314. In overview, block 302 may be described as setting a number (K) of AC modes to use in the detection technique, block 304 may be described as creating a training image set, block 306 may be described as obtaining a training image from the set, block 308 may be described as computing the probabilities for the first digits of quantized DCT coefficients for each K AC mode of the training image, block 310 may be described as creating a feature vector using the computed probabilities, and block 314 may be described as applying a supervised learning algorithm to the feature vectors to create classifiers for a classification system that may be used by the double compression detection process described later in conjunction with FIG. 9. The various functional operations for these identified blocks will be described in further detail below.

For convenience, throughout the following description, the term "QDCT coefficients" refers to the quantized AC DCT coefficients in the luminance channel for either gray-scale images or color images unless otherwise specified. The teachings of the present disclosure may also be applicable to the other channels (i.e., chrominance for the blue component and chrominance for the red component). The training process 300 may be performed using several variations, such as varying the number of uncompressed images used for training and varying the size of the uncompressed images. In some embodiments, the training process 300 may utilize 1338 uncompressed images with a size of 384×512 (or 512×384) in UCID (uncompressed colour image database) format. UCID is a database of over 1300 images that provide a benchmark dataset for image retrieval. All of the images in the UCID may be captured and available in an uncompressed form. By using images from the UCID, a comparison of compression and detection techniques may be performed.

In overview, during the training process 300, double compressed images may be generated by consecutively compressing the images by a primary quality factor (QF1) and a secondary quality factor (QF2). Each of the double compressed images has a corresponding single compressed image that has the same quality factor as QF2. In some embodiment, several pairs of primary QF and secondary QF, ranging from 50 to 95 with a step size of 5, may be used during training process 300. Thus, during the training process, both the primary quality factor and the secondary quality factor may be known.

The distribution of the QDCT coefficients of a single compressed image may follow a generalized Laplacian distribution or a Cauchy distribution. In addition, the distribution of the first digits of all the QDCT coefficients of a single compressed image may follow a parametric logarithmic function, called a generalized Benford's Law, as follows:

$$p(d) = N\log_{10}\left(1 + \frac{1}{s + d^q}\right), d \in \{1, 2, \ldots, 9\} \quad (2)$$

where N is a normalization factor which makes p(d) a probability distribution, and s and q are model parameters to precisely describe the distributions for different images with different quality factors. The first digit x of a QDCT coefficient may be computed as follows:

$$d = \left\lfloor \frac{x}{10^{\lfloor \log_{10} x \rfloor}} \right\rfloor, \quad (3)$$

when x is a non-zero integer. The operation denoted with brackets $\lfloor . \rfloor$ is the operation of floor rounding, commonly referred to as truncation. For example, if x=49, d=floor rounding of (49/10), where floor rounding of $\log_{10}$ (49)=1. Therefore, d=4, and 4 is the first digit.

Training process 300 includes block 302 where the number K of AC modes used in the detection technique may be set. The functionality of block 302 may be hard coded, implemented as a default parameter value, and/or implemented as a modifiable variable each time training process 300 is performed. As mentioned above in conjunction with FIG. 2, there may be a total of 63 AC modes and one DC mode in each QDCT block. Therefore, the range of K may be given as 1≦K≦63. After experimentation, it was determined that detection rates of double compressed JPEG images were close to or only slightly above random guessing (50%) when the first digits of all the QDCT coefficients were evaluated and when the first compression factor QF1 was greater than the second compression factor QF2. Thereafter, it was determined that by focusing on first digit features extracted from individual modes and not extracting features from all of the modes, the reliability of detecting double compressed JPEG images may be increased for when the first compression factor QF1 is greater than the second compression factor QF2 (QF1>QF2).

The present detection technique may utilize "distinguishable modes" to improve the detection of double compressed images. Briefly, a "distinguishable mode", which will be described later in conjunction with FIG. 5, may be described as an AC mode where the second quantization step (QS2) is not an integer multiple of the first quantization step (QS1). By focusing on "distinguishable modes", the present detection technique may improve the detection of double compressed images when the first quantization step is larger than the second quantization step (i.e., QF1>QF2).

It was determined that the number K of AC modes needed to achieve an optimal detection rate at each of the various quality factor settings may be based on Benford's law. The probabilities of the first digits of the quantized DCT coefficients may be computed and analyzed to determine whether the distribution of the first digits for each of the individual AC modes fit the generalized Benford's law. As noted above, the distribution of the first digits of all the QDCT coefficients of a single compressed JPEG image may follow a parametric logarithmic function, called the generalized Benford's Law shown in Eq. (2) above. A $\chi^2$ divergence may be evaluated as a metric to measure the quality of the fit with the Benford's Law. The $\chi^2$ divergence may be defined as:

$$\chi^2 = \sum_{d=1}^{9} \frac{(p_i(d) - \hat{p}_i(d))^2}{\hat{p}_i(d)} \quad (4)$$

where $p_i(d)$ ($d \in \{1, 2, \ldots, 9\}$) denotes the observed first digit distribution of QDCT coefficients in the i-th mode and $\hat{p}_i(d)$ ($d \in \{1, 2, \ldots, 9\}$) denotes the corresponding theoretical distribution. Any number of curve fitting tools may be used to compute the parameters of the theoretical distribution in Eq. (2). One such curve fitting tool is Matlab® Curve Fitting Toolbox manufactured by The Mathworks®, Inc. Smaller values of the $\chi^2$ divergence may correspond to a better fit of the observed distribution to the generalized Benford's law.

Figure 4:
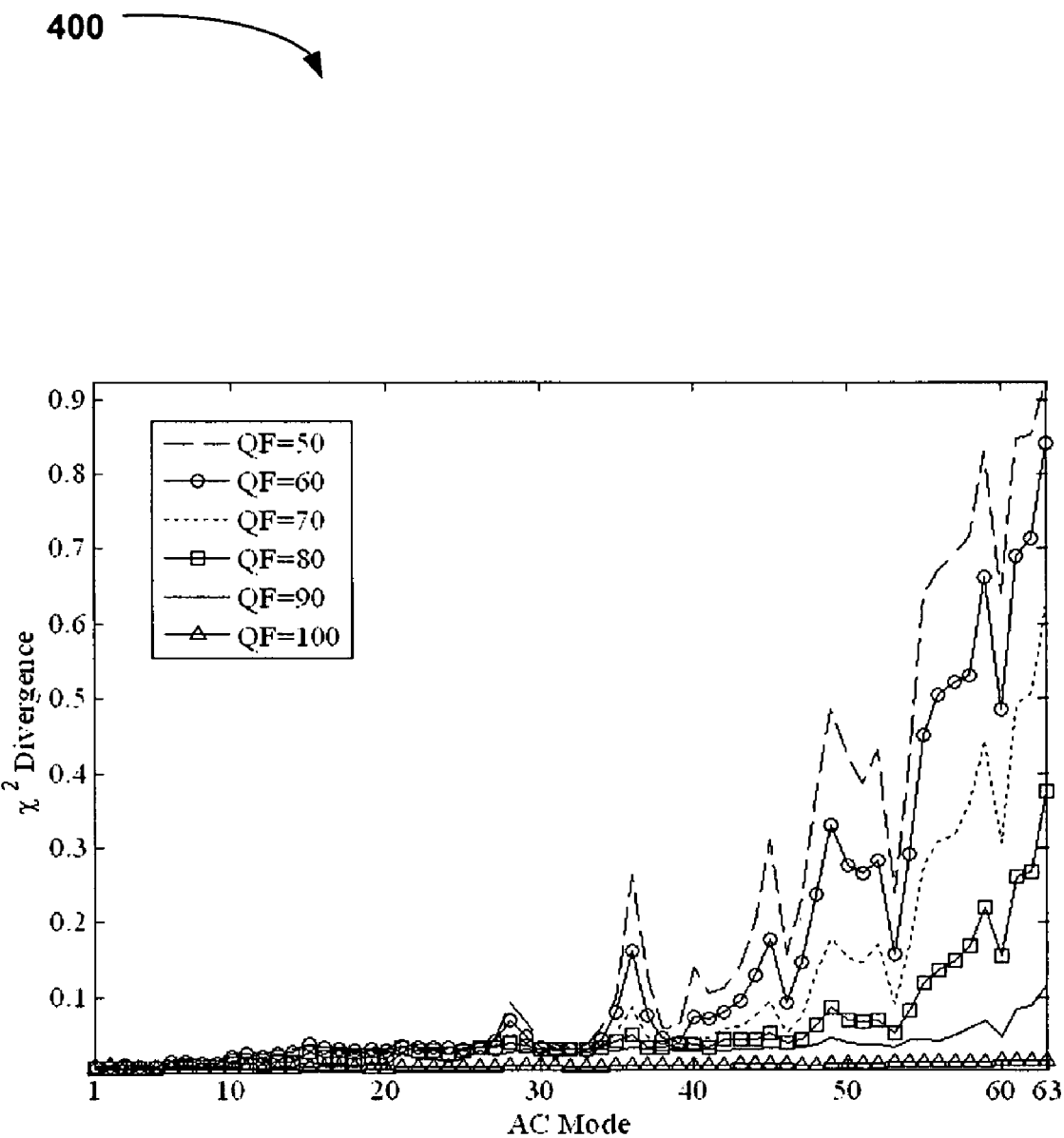
FIG. 4 is a chart of a mean $\chi^2$ divergence between an actual first digits distribution and a generalized Benford's Law for each AC mode over several double compressed training images.

After averaging values of the $\chi^2$ divergence over several uncompressed images (e.g., 1338 UCID images) for each AC mode and for QFs from 50 to 100, it was determined that low frequency AC modes may be more prone to having smaller divergence values than high frequency AC modes. Turning briefly to FIG. 4, FIG. 4 is a chart 400 of the $\chi^2$ divergence between the actual first digits distribution and the generalized Benford's Law for each AC mode (in zigzag order) in accordance with the present disclosure. As shown in chart 400, for each specific AC mode, images with a small QF have larger $\chi^2$ divergence value than when the specific mode has a larger QF. Thus, it was determined that the first digit distribution of QDCT coefficients from individual AC modes does not always fit very well with the generalized Benford's law, especially for the high frequency AC modes with low QFs.

However, even though the distributions of the first digits of individual modes may not strictly follow the generalized Benford's law, the operation of double quantization which occurs in double compressed images may still introduce a statistical pattern different from single quantization.

It was determined that having some distinguishable modes within the first K AC modes allowed the present detection technique the ability to yield favorable detection results over varying quality factors in accordance with some embodiments of the present disclosure. Therefore, K was set to 20 (K=20) in some embodiments which kept the dimension of the resultant feature vector low enough to remain practical. One will note that in certain situations fewer than 20 AC modes or greater than 20 AC modes may be chosen to achieve the desired accuracy. In other words, K may be chosen to include any number of distinguishable modes that yield a desired detection rate. In some embodiments, it was determined that having three distinguishable modes within the first 20 AC modes yielded favorable detection rates over varying quality factors.

Briefly, turning to FIG. 5 is a diagram of two quantization tables with different quality factors suitable for use by the training process of FIG. 3. Quantization table 500 represents quantization steps for QF=95 and quantization table 502 represents quantization steps for QF=50. In the embodiment illustrated in FIG. 5, K=20 and the set of K AC modes are designated within area 510 and 512, respectively, for tables 500 and 502. Table 510 illustrates the zigzag numbering for the AC modes in the lower right hand corner of each box within area 510. One will note that three of the AC modes represent distinguishable modes (i.e., AC modes 11, 13, and 16, designated with bold typing) in accordance with some embodiments of the present disclosure. For example, AC mode 11 for quantization table 500 has a value of 2 and the corresponding AC mode 11 for quantization table 502 has a value of 17. Because the values are not multiples, the AC mode is designated as a distinguishable mode. As discussed previously for FIG. 2, a mode may refer to the same location within each block.

Returning back to FIG. 3, at block 304, creating a training image set may be performed. The training image set may include any number of single compressed images with various quality factors used in the compression and any number of double compressed images with various primary quality factors and secondary quality factors used in the compression. Processing continues at block 306

At block 306, obtaining a training image from the training image set may be performed. The training image may be a single compressed training image or a double compressed training image. Processing continues at block 308. At block 308, computing a probability of first digits of QDCT coefficients for each K AC mode for the training image may be performed. One will appreciate that the training images may be split into multiple QDCT blocks which may be processed to obtain the probability of first digits of QDCT coefficients for one mode of the training image. In some embodiments, an average over the multiple QDCT blocks for one mode may be used to represent the probability for that AC mode for the given training image.

Figure 6:
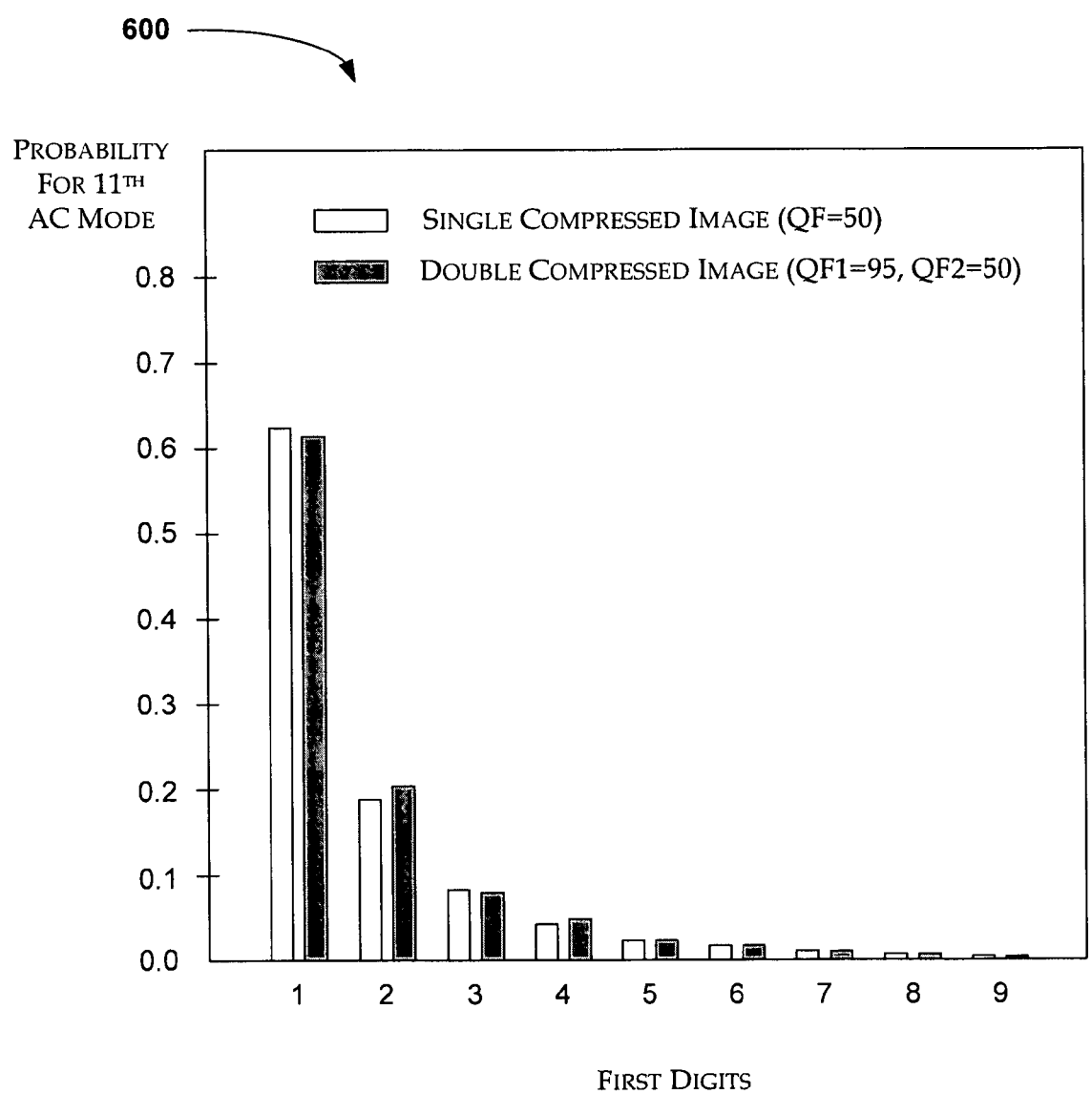
FIG. 6 is a chart comparing the mean probability values of first digits for a specific AC mode for a double compressed image with mean probability values of first digits for the specific AC mode of a corresponding single compressed image, illustrating that the probabilities of the first digits exhibit different patterns for single compressed images in comparison with double compressed images.

Turning briefly to FIG. 6, FIG. 6 is a chart 600 comparing the mean probability of first digits for a specific AD mode for a double compressed image with the mean probability values of first digits for the specific mode of a corresponding single compressed image, illustrating that the probabilities of the first digits exhibit different patterns for a single compressed image in comparison with a double compressed image. Chart 600 compares the mean values for a specific mode for a double compressed JPEG image with the mean values for the specific mode of a corresponding single compressed JPEG image, The specific mode shown in chart 600 is the $11^{th}$ AC mode. The mean values were obtained using 1338 double compressed images and their corresponding single compressed JPEG images. The double compressed JPEG images had a primary quantization factor of 95 and a second quantization factor of 50. The single compressed JPEG images had a primary quantization factor of 50. As shown in chart 600, the difference between the double compressed JPEG image and the single compressed JPEG image may be small. However, through pattern recognition techniques, the difference may be learned and may be used for classification, as will be described below in more detail. While chart 600 illustrates mean values for the probabilities of the first digits, in block 308 the computed probabilities may be for one training image.

Returning to FIG. 3, at block 310, creating a feature vector using the computed probabilities in block 308 may be performed. As will be described below in conjunction with block 314, the feature vectors of the training images may be used to determine classifiers. In some embodiments, where K=20, the probability of the first digits for the first 20 QDCT coefficients, denoted $p_i(d)$ ($i \in \{1, 2, \ldots, 20\}$ and $d \in \{1, 2, \ldots, 9\}$) form a feature vector in 20×9=180 dimensions. In these embodiments, the first 20 QDCT modes in the zigzag order may be used. For each mode, the probability of first digits may be extracted. Because the digits have only 9 values (e.g., 1, 2, ... to 9), the resulting feature vector may have 20×9=180 dimensions (i.e., 180-D). The 180-D feature vector may be arranged in the following order: $[p_1(1), p_1(2), \ldots, p_1(9), p_2(1), p_2(9), \ldots, p_2(9), \ldots, p_{20}(1), \ldots, p_{20}(9)]$. However, other embodiments may arrange the feature vector in a different manner without departing from the present disclosure. A sample feature vector is described below in conjunction with FIG. 7.

At decision block 312, a determination may be made as to whether another training image is available and/or desired. If another training image is available and/or desired, processing loops back to block 306 where another training image is obtained and processing proceeds to block 308 as discussed above. If no additional training images are available and/or desired, processing continues at block 314.

At block 314, applying a supervised learning algorithm to the feature vectors may be performed to create one or more classifiers for a classification system. In some embodiments, a two-class classification system may be used and in some other embodiments, a multi-class classification system may be used. The multi-class classification system has an advantage of being able to identify the primary QF of the double compressed JPEG image.

In overview, a classifier may be a type of function that maps an input feature vector to a value. For example, in some embodiments with a two-class classification system, a two-class linear classifier may be a discriminate function such as $f(\vec{z}) = \vec{w}\vec{z} + b$, where $\vec{z}$ is a feature vector, $\vec{w}$ is the weight vector, and b is the bias. Then, for an input feature vector $\vec{z}$, when $f(\vec{z}) > 0$, the result may be considered as a positive class, and when $f(\vec{z}) < 0$, the result may be considered a negative class. By training a classifier, the weight vector $\vec{w}$ and the bias b vector may be obtained. As will be explained later in conjunction with FIG. 9, these classifiers may be used to map the input feature vector to a value that provides the result as to whether the associated suspect image may be single compressed or double compressed.

For embodiments using the two-class classification, block 314 may use any known supervised learning algorithm, such as Fisher Linear Discriminant (FLD) analysis. One skilled in the art will appreciate that other supervised learning algorithms may also be used without departing from the present disclosure. In some embodiments, 1138 of the 1338 randomly selected double compressed images and their associated single compressed images were used to train the FLD classifier. While the two-class classification allows the detection process shown in FIG. 9 and described below, to provide superior detection results, the two-class classification can not be applied immediately to practical scenarios because the two-class classification assumes that the quality factor (QF) in the primary compression is given. However, in practice, there may be no prior knowledge of the primary QF in a double compressed image.

The primary QF may be identified by using a "one-against-one" multi-class classification strategy. Therefore, for embodiments using the multi-class classification, block 314 may use a "one-against-one" multi-class classification strategy. In this strategy, C(C−1)/2 binary classifiers may be constructed for a total number of C classes. Each class may represent a candidate primary QF and each classifier discriminates between two classes. In some embodiments, the FLD may still be used as a binary classifier in the multi-class classification strategy. After the training process 300 is complete, the classifiers may be used to detect double compressed image. A sample set of classifiers is described below in conjunction with FIG. 8.

Figure 7:
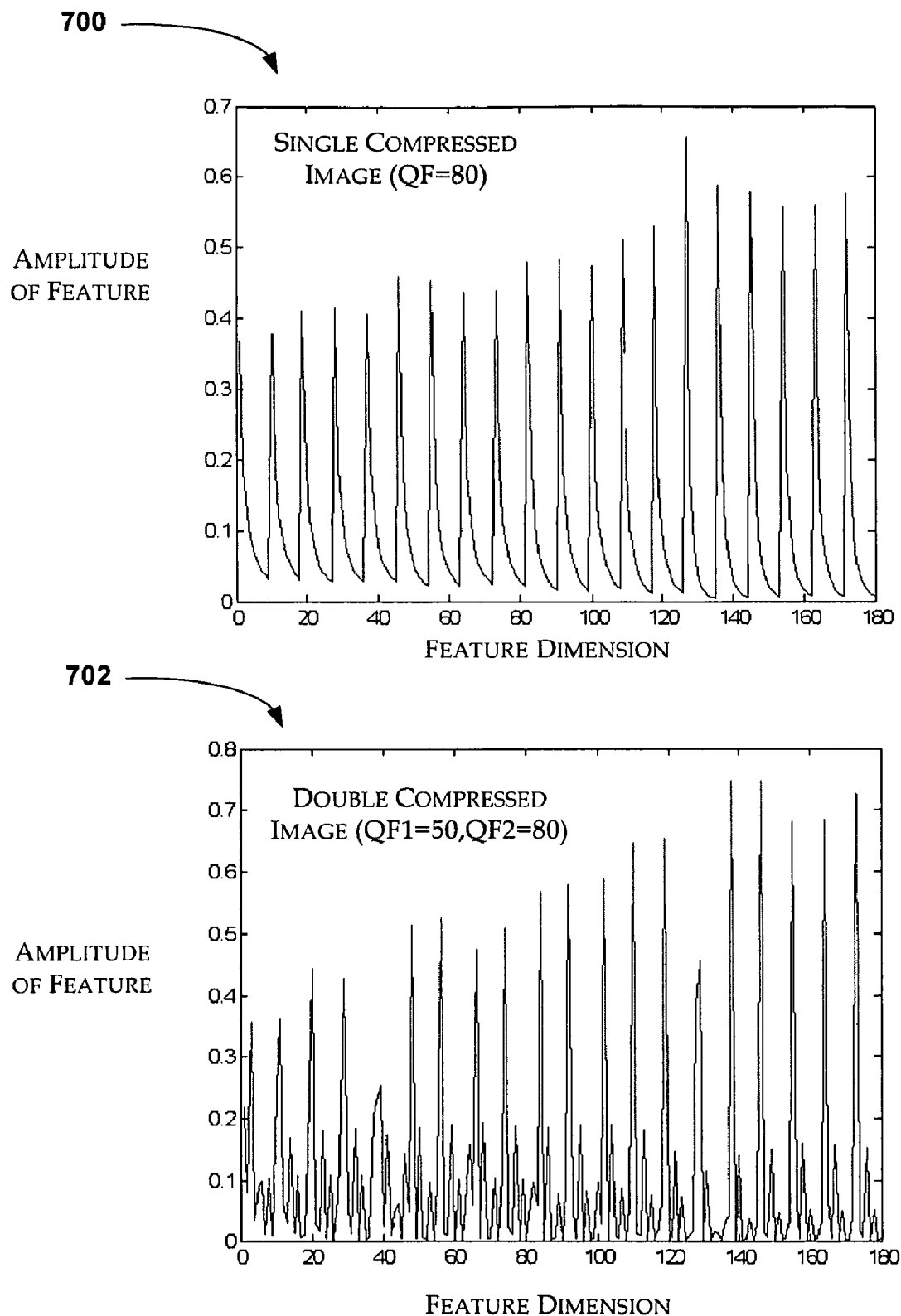
FIG. 7 is an example representation of two feature vectors, one feature vector is for a single compressed image (QF=80) and another feature vector is for a double compressed image (QF1=50, QF2=80)

FIG. 7 is an example representation of two feature vectors, one feature vector 700 is for a single compressed image (QF=80) and another feature vector 702 is for a double compressed image (QF1=50, QF2=80). The x-axis in feature vectors 700 and 702 represent an index of the feature dimension, and the y-axis represents an amplitude of the feature.

Figure 8:
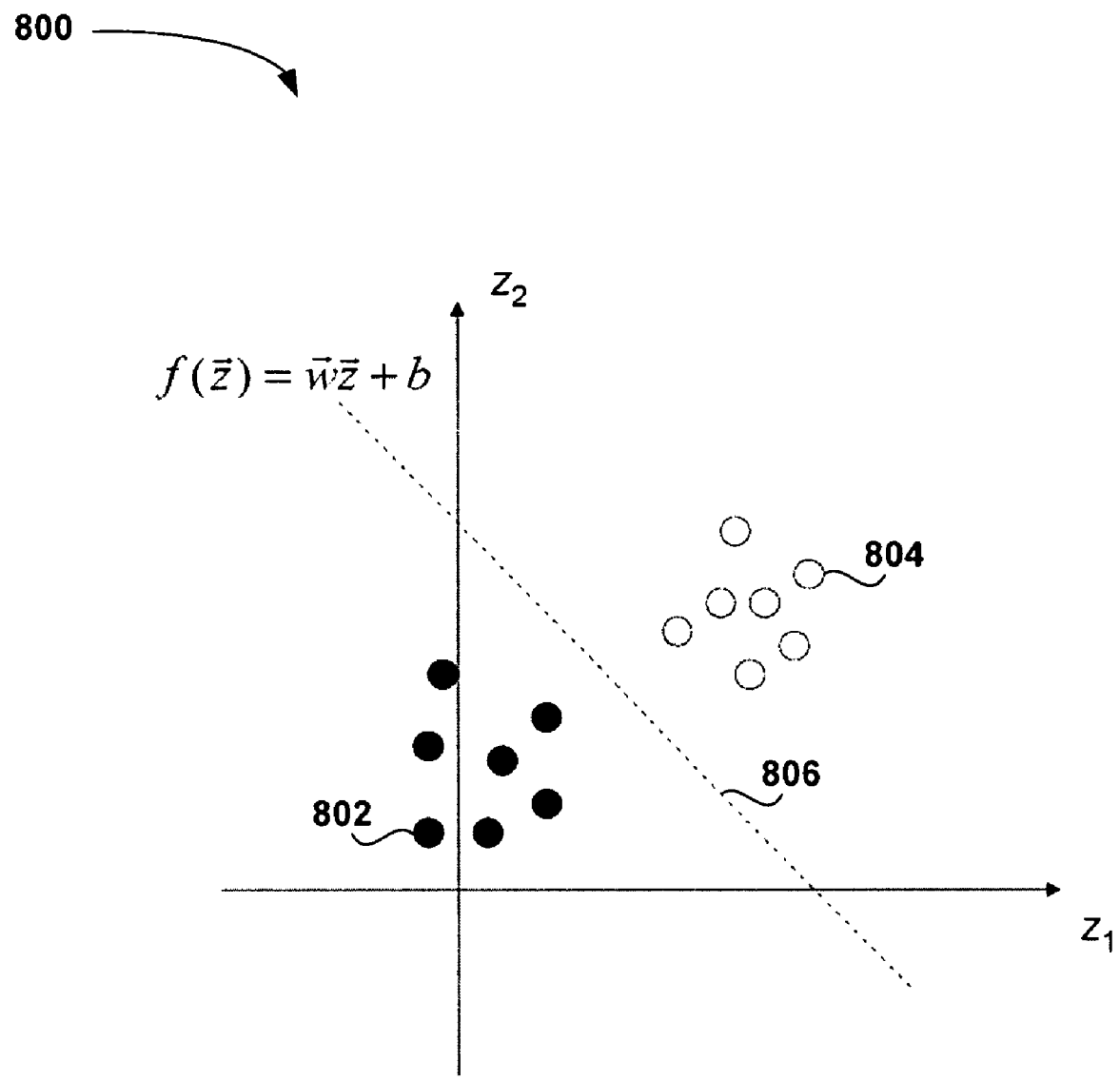
FIG. 8 is an example representation of a set of classifiers created during the training process of FIG. 3.

FIG. 8 is an example representation of a set of classifiers created during the training process of FIG. 3. The example representation is for a 2-D linear classifier. The x-axis and y-axis are illustrated as the amplitude of the feature, $z_1$ and $z_2$, respectively. Black dots (e.g., black dot 802) represent images with results in a positive class and white dots (e.g., white dot 804) represent images with results in a negative class. In some embodiments, the positive class corresponds to images that are double compressed and the negative class corresponds to images that are single compressed. The dotted line 806 represents a linear classifier that can separate the two classes. One will note that FIG. 8 is for illustration and that a classifier in accordance with some embodiments of the present disclosure may be a hyper-plane instead of a line.

Figure 9:
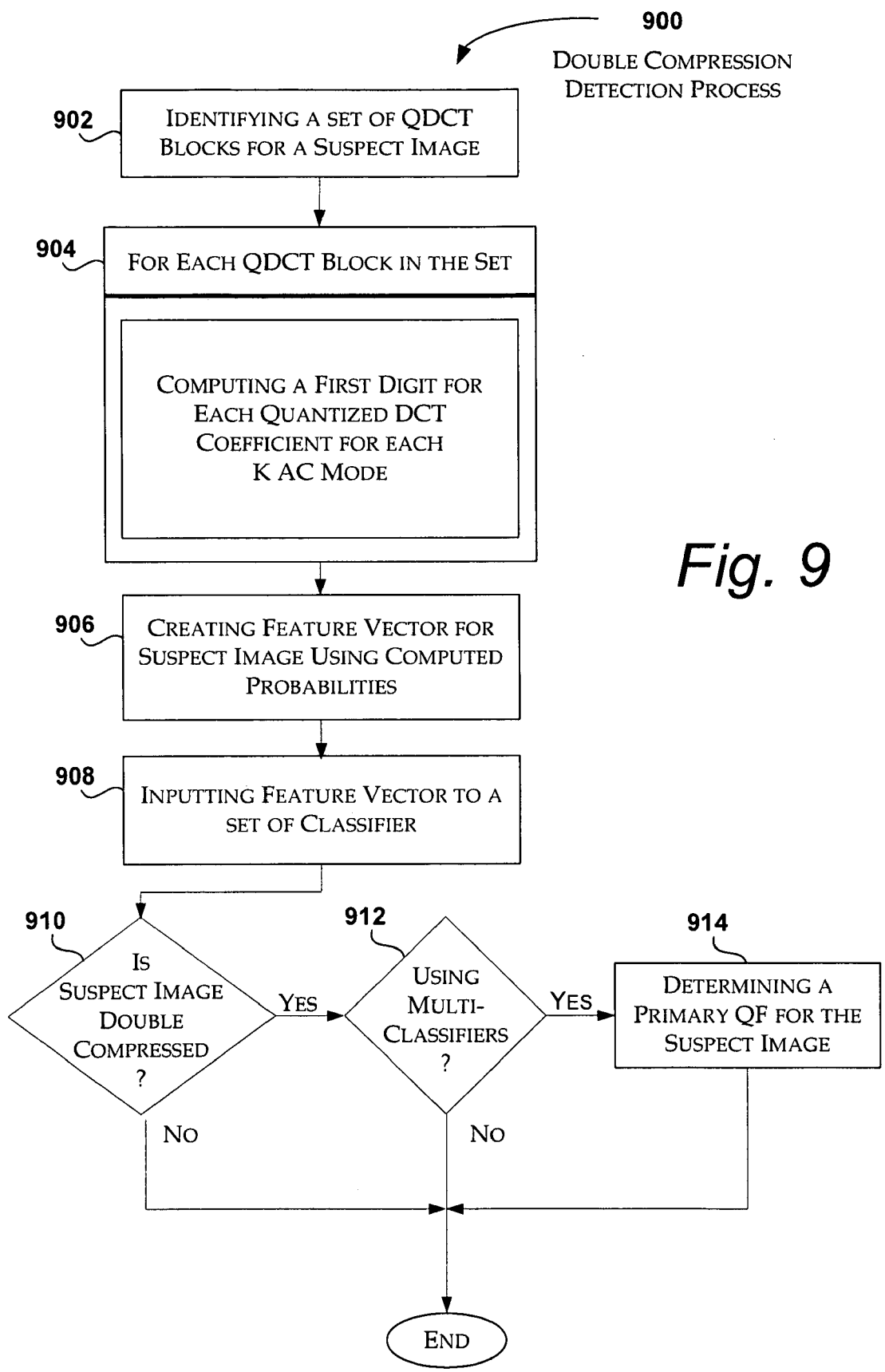
FIG. 9 is a flow diagram illustrating a double compression detection process suitable for use in FIG. 1 for detecting altered digital images in accordance with at least some embodiments of the present disclosure.

FIG. 9 is a flow diagram illustrating a double compression detection process 900 suitable for use in FIG. 1 for detecting altered digital images in accordance with at least some embodiments of the present disclosure. The example double compression detection process 900 illustrated in FIG. 9 may include one or more processing operations as illustrated by blocks 902, 904, 906, 908 and 914. In overview, block 902 may be described as identifying a set of QDCT blocks for a suspect image, block 904 may be described as computing a first digit for each quantized DCT coefficient for each K AC mode, block 906 may be described as creating a feature vector using the computed probabilities, block 908 may be described as inputting the feature vector to a set of classifiers, and block 914 may be described as determining a primary quality factor for the suspect image. The various functional operations for these identified blocks will be described in further detail below.

A digitally altered image may result when an original JPEG image is opened in an photo-editing software application, edited by modifying some of the color and/or luminance components in the original JPEG image, and saved as another JPEG image. The newly saved JPEG image may have the same name as the original JPEG image or a different name. Saving the modified JPEG image causes the edited JPEG image to undergo the processing outlined in FIG. 2 for the modified JPEG image. Thus, the modified JPEG image has then undergone two JPEG compressions. In other words, the JPEG image has been double compressed.

At block 902, identifying a set of QDCT blocks for a suspect image may be performed. The suspect image may be any image that needs to be authenticated as an original image without any alterations. Thus, the suspect image may be an image from a website, one frame from a video file, or the like. Processing may continue form block 902 to block 904.

At block 904, computing a first digit for each quantized DCT coefficient for each K AC mode is performed. In some embodiments, K is set to a value of 20, meaning that the first digits of the quantized DCT coefficients in the first 20 AC modes may be computed. Processing may continue from block 904 to block 906.

At block 906, creating a feature vector for the suspect image using computed probabilities may be performed. In some embodiments, the feature vector may be a 9×K vector. A distribution of the first digits calculated in block 904 may be represented in the feature vector. Processing may continue from block 906 to block 908.

At block 908, inputting the feature vector to a set of classifiers may be performed. The classifiers may be the classifiers created during the training process illustrated in FIG. 3. Each classifier may be a type of function that maps an input feature vector to a value. For example, in some embodiments with a two-class classification system, a two-class classifier may be a discriminate function such as $f(\vec{z})=\vec{w}\vec{z}+b$, where $\vec{z}$ is a feature vector, $\vec{w}$ is the weight vector, and b is the bias. Then, for an input feature vector $\vec{z}$, when $f(\vec{z})>0$, the result may be considered as a positive class, and when $f(\vec{z})<0$, the result may be considered a negative class. During training of the classifier, the weight vector $\vec{w}$ and the bias b vector may be obtained. The classifiers may be used to map the input feature vector to a value that provides the result as to whether the associated suspect image may be single compressed or double compressed. Processing may continue from block 908 to decision block 910.

At decision block 910, determining whether the suspect image is double compressed may be performed. If the output of the classifier determines that the feature vector belongs to a double compressed type, the suspect image may be considered to be double compressed and therefore, possibly digitally altered. If the output of the classifier determines that the feature vector belongs to a single compressed type, processing of the suspect image may end. Otherwise, processing may continue from decision block 910 to decision block 912.

At decision block 912, determining whether multi-classifiers are being used may be performed. In some embodiments, each class of the multi-class classification system may represent a candidate primary quality factor and each of the classifiers in the set may discriminate between two of the classes. If multi-classifiers are not being used, processing may end. Otherwise, processing may continue from decision block 912 to block 914.

At block 914, determining a primary quality factor for the suspect image may be performed. In some embodiments, the feature vector may be assigned to each of the classes and the classifiers may be used to determine the most likely class. The most likely class may then indicate the candidate primary quality factor for the suspect image. Processing may end after block 914.

Figure 10:
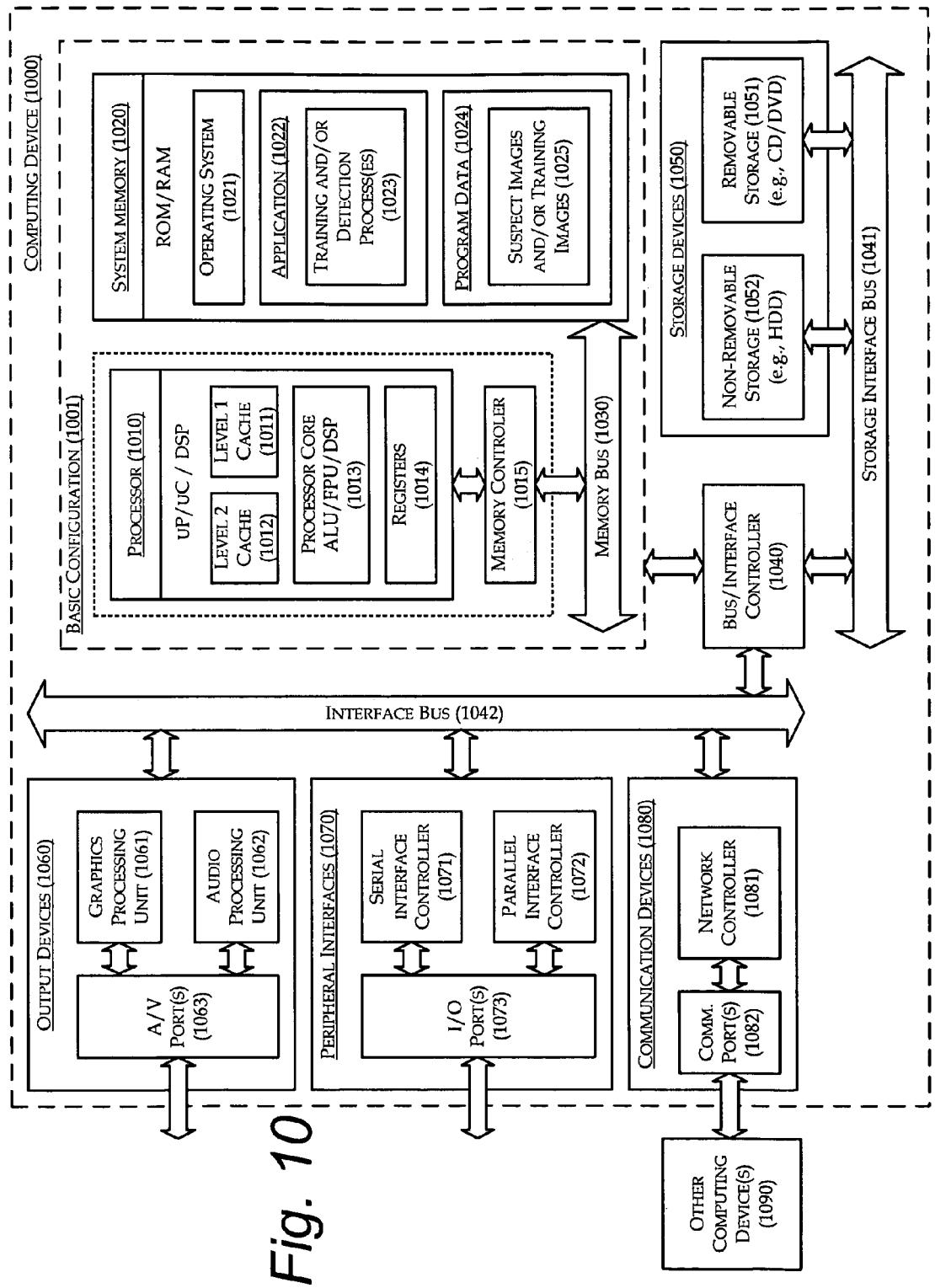
FIG. 10 is a functional block diagram of an example computing device that may be used to implement one or more embodiments of the training process and double compression detection process of the detection technique in accordance with at least some embodiments of the present disclosure.

FIG. 10 is a functional block diagram of an example computing device 1000 that may be used to implement one or more embodiments of the training process and detection process of the detection technique in accordance with at least some embodiments of the present disclosure. Computing device 1000 may be a dumb terminal, a mobile device, a laptop device, a desktop device, a server, or some other device. In basic configuration 1001, computing device 1000 may include one or more processors 1010 and system memory 1020. A memory bus 1030 can be used for communicating between the one or more processors 1010 and the system memory 1020.

Depending on the desired configuration, processor 1010 can be of any type including but not limited to a microprocessor (µP), a microcontroller (µC), a digital signal processor (DSP), or any combination thereof. Processor 1010 can include one more levels of caching, such as a level one cache 1011 and a level two cache 1012, a processor core 1013, and registers 1014. The processor core 1013 can include an arithmetic logic unit (ALU), a floating point unit (FPU), a digital signal processing core (DSP Core), or any combination thereof. A memory controller 1015 can also be used with the processor 1010, or in some implementations the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 1020 typically includes an operating system 1021, one or more applications 1022, and program data 1024.

Application 1022 may include a training process and/or detection process 1023 that may be arranged to facilitate analysis, training, and/or detection of double-compressed JPEG images in accordance with the present disclosure. Program data 1024 may include suspect JPEG images and/or training images 1025 that may be useful for various training, analysis, and/or detection operations described herein. In some embodiments, application 1022 can be arranged to operate on program data 1024 on the operating system 1021 such that analysis, training, and/or detection of double-compressed JPEG images may be facilitated on general purpose computers. This described basic configuration is illustrated in FIG. 10 by those components within dashed line 1001.

Computing device 1000 can have additional features or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1020, removable storage 1051, and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of device 1000.

Computing device 1000 can also include an interface bus 1042 for facilitating communication from various interface devices (e.g., output interfaces, peripheral interfaces, and communication interfaces) to the basic configuration 1001 via the bus/interface controller 1040. Example output devices 1060 include a graphics processing unit 1061 and an audio processing unit 1062, which can be configured to communicate to various external devices such as a display or speakers via one or more A/V port 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication device 1080 includes a network controller 1081, which can be arranged to facilitate communications with one or more other computing devices 1090 over a network communication via one or more communication ports 1082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

The processes described above may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

FIG. 11 is a diagram generally illustrating a computer product configured to perform processing that detects an altered digital image in accordance with some embodiments of the present disclosure. The computer program product 1100 may be one of several forms, such as a computer storage media having computer-executable instructions 1102, a recordable medium 1104, a computer-implemented method 1106, or the like. When the computer-executable instructions are executed, a method or process may be performed. The method or process may include one or more of identifying 1110 a set of quantized DCT blocks that represent the suspect image; for each quantized DCT block representing the suspect image 1112, computing 1114 a first digit for each quantized DCT coefficient in each K AC mode, creating 1116 a feature vector using the first digits, inputting 1118 the feature vector to a set of classifiers, and determining 1120 a result for the suspect image based on an output from the set of classifiers.

FIG. 12 is a diagram generally illustrating a computer product configured to perform processing that detects an altered digital image in accordance with some embodiments of the present disclosure. The computer program product 1200 may be one of several forms, such as a computer storage media having computer-executable instructions 1202, a recordable medium 1204, a computer-implemented method 1206, or the like. When the computer-executable instructions are executed, a method or process may be performed. The method or process may include one or more of extracting 1210 a feature vector from the suspect image, the feature vector representing a first digit distribution over K AC modes of the suspect image, inputting 1212 the feature vector to a set of classifiers, determining 1214 a result for the suspect image based on output from the set of classifiers, wherein the result indicates whether the suspect image has undergone double compression, and 1216 determining a primary quality factor for the suspect image by assigning the feature vector to each class of a multi-class system, each class representing a candidate primary quality factor and using the set of classifiers to determine the most likely class.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art. The various embodiments disclosed herein are for purposes of illustration and are not intended to be limiting, with the true scope and spirit being indicated by the following claims.

What is claimed is:

1. A computer-implemented method for detecting whether a suspect image has been digitally altered, the method comprising:
   identifying a set of quantized DCT blocks that represents the suspect image, each quantized DCT block including a plurality of AC modes and each AC mode corresponding to one of a plurality of quantized DCT coefficients, the plurality of quantized DCT coefficients having a one-to-one correspondence with the plurality of AC modes, each AC mode being located at a consistent position within each of the quantized DCT blocks in the set;
   computing a first digit for each of the quantized DCT coefficients corresponding to one of a variable pre-determined number of AC modes in each quantized DCT block, wherein the variable pre-determined number of AC modes varies based on a number of distinguishable AC modes located within a subset of the plurality of AC modes determined during a training process for creating a set of classifiers, the subset including consecutively numbered AC modes out of the plurality of AC modes numbered in a zigzag order, wherein the distinguishable AC modes have a second quantization step that is not an integer multiple of a first quantization step during the training process;
   creating a feature vector using the first digits computed for each quantized DCT block, the feature vector representing a first digit distribution over the pre-determined number of AC modes for the suspect image;
   inputting the feature vector to the set of classifiers; and
   determining a result for the suspect image based on an output from the set of classifiers.

2. The computer-implemented method recited in claim 1, wherein the set of classifiers comprise a function that maps the feature vector to a value that is the output.

3. The computer-implemented method recited in claim 1, wherein the set of classifiers comprise three or more classifiers for a multi-class classification system.

4. The computer-implemented method recited in claim 3, wherein each class of the multi-class classification system represents a candidate primary quality factor and each classifier in the set of classifiers discriminates between two classes.

5. The computer-implemented method recited in claim 1, further comprising determining a primary quality factor for the suspect image based on the set of classifiers which support three or more classes.

6. The computer-implemented method recited in claim 5, wherein determining the primary quality factor for the suspect image comprises assigning the feature vector to each of the three or more classes, each class represents a candidate primary quality factor, and using the set of classifiers to determine the primary quality factor for the suspect image.

7. The computer-implemented method recited in claim 1, wherein the set of classifiers is created by applying a supervised learning algorithm during the training process.

8. A non-transitory computer storage media having computer-executable instructions for detecting whether a suspect image has been digitally altered, the computer-executable instructions, when executed, perform a method comprising:
 extracting a feature vector from the suspect image, the feature vector representing a first digit distribution over K AC modes of the suspect image, wherein K is less than a total number of AC modes in a plurality of quantized DCT blocks that represent the suspect image and is variable based on a number of distinguishable AC modes located within a subset of the plurality of AC modes determined during a training process for creating a set of classifiers, the subset including consecutively numbered AC modes out of the plurality of AC modes numbered in a zigzag order, wherein the distinguishable AC modes have a second quantization step that is not an integer multiple of a first quantization step during the training process;
 inputting the feature vector to the set of classifiers; and
 determining a result for the suspect image based on output from the set of classifiers, wherein the result indicates whether the suspect image has undergone double compression.

9. The computer storage media recited in claim 8, wherein the first digit distribution represents a distribution of a first digit for each of a plurality of quantized DCT coefficients for the plurality of quantized DCT blocks.

10. The computer storage media recited in claim 8, wherein the set of classifiers comprises a function that maps the feature vector to a value that corresponds to the output from the set of classifiers.

11. The computer storage media recited in claim 10, wherein the value indicates whether the suspect image is associated with a class representing single compressed images or another class representing double compressed images.

12. The computer storage media recited in claim 8, further comprising determining a primary quality factor for the suspect image using a multi-class classification system, wherein the set of classifiers comprises three or more classifiers.

13. The computer storage media recited in claim 12, wherein determining the primary quality factor of the suspect image comprises assigning the feature vector to each of the classes within the multi-class classification system and using the set of classifiers to determine the primary quality factor for the suspect image.

14. The computer storage media recited in claim 8, wherein a number for K is based on a $\chi^2$ divergence metric that measures a quality of a fit of the distribution of the first digits of QDCT coefficients of training images according to Benford's law.

15. A computing device configured to analyze digitally altered images, the computing device comprising:
 a computer storage media including computer-readable instructions;
 a processor configured by the computer-readable instructions to:
  identify a set of quantized DCT blocks that represents the suspect image, each quantized DCT block including a plurality of AC modes and each AC mode corresponding to one of a plurality of quantized DCT coefficients, the plurality of quantized DCT coefficients having a one-to-one correspondence with the plurality of AC modes, each AC mode being located at a consistent position within each of the quantized DCT blocks in the set;
  compute a first digit for each of the quantized DCT coefficients corresponding to one of a variable pre-determined number of AC modes in each quantized DCT block, wherein the variable pre-determined number of AC modes varies based on a number of distinguishable AC modes located within a subset of the plurality of AC modes determined during a training process for creating a set of classifiers, the subset including consecutively numbered AC modes out of the plurality of AC modes numbered in a zigzag order, wherein the distinguishable AC modes have a second quantization step that is not an integer multiple of a first quantization step during the training process;
  create a feature vector using the first digits computed for each quantized DCT block, the feature vector representing a first digit distribution over the pre-determined number of AC modes for the suspect image;
  input the feature vector to the set of classifiers; and
  determine a result for the suspect image based on an output from the set of classifiers.

16. The computing device recited in claim 15, wherein the set of classifiers comprise a function that maps the feature vector to a value that represents the output from the set of classifiers.

17. The computing device recited in claim 15, wherein the processor is further configured by the computer-readable instructions to:
 determine a primary quality factor for the suspect image using a multi-class classification system and the set of classifiers comprise three or more classifiers.

18. The computing device recited in claim 17, wherein each class of the multi-class classification system represents a candidate primary quality factor and each of the classifiers discriminate between two classes.

19. The computing device recited in claim 18, wherein: one of the classes of the multi-classification system is determined to be a most likely class based on the output of the set of classifiers, and the candidate primary quality factor associated with the most likely class represents the primary quality factor for the suspect image.

20. The computing device recited in claim 15, wherein the set of classifiers is created by applying a supervised learning algorithm during the training process.

* * * * *

UNITED STATES PATENT AND TRADEMARK OFFICE
CERTIFICATE OF CORRECTION

PATENT NO. : 8,260,067 B2
APPLICATION NO. : 12/421949
DATED : September 4, 2012
INVENTOR(S) : Shi et al.

Page 1 of 1

It is certified that error appears in the above-identified patent and that said Letters Patent is hereby corrected as shown below:

On the Title Page, in Field (60), under "Related U.S. Application Data", in Column 1, Lines 1-2, delete "Apr. 17, 2008." and insert -- Apr. 18, 2008. --, therefor.

On the Title Page, in Field (56), under "OTHER PUBLICATIONS", in Column 2, Line 13, delete "Primary." and insert -- Primary --, therefor.

In Fig. 10, Sheet 10 of 12, below "PROCESSOR (1010)", in Line 1, delete "UP/UC" and insert -- $\mu P/\mu C$ --, therefor.

In Fig. 10, Sheet 10 of 12, in Box "(1015)", in Line 1, delete "CONTROLER" and insert -- CONTROLLER --, therefor.

In Column 1, Line 9, delete "Apr. 17, 2008," and insert -- Apr. 18, 2008, --, therefor.

In Column 3, Line 21, delete "JFIF JPEG" and insert -- JFIF (JPEG --, therefor.

In Column 8, Line 10, delete "306" and insert -- 306. --, therefor.

In Column 8, Line 63, delete "$p_2(1), p_2(9), ... , p_2(9), ..., p_{20}(1), ... , p_{20}(9)$]." and insert -- $p_2(1), p_2(2), ... , p_2(9), ..., p_{20}(1), p_{20}(2), ... , p_{20}(9)$]. --, therefor.

Signed and Sealed this
Twenty-sixth Day of February, 2013

Teresa Stanek Rea
*Acting Director of the United States Patent and Trademark Office*